UNITED STATES PATENT OFFICE.

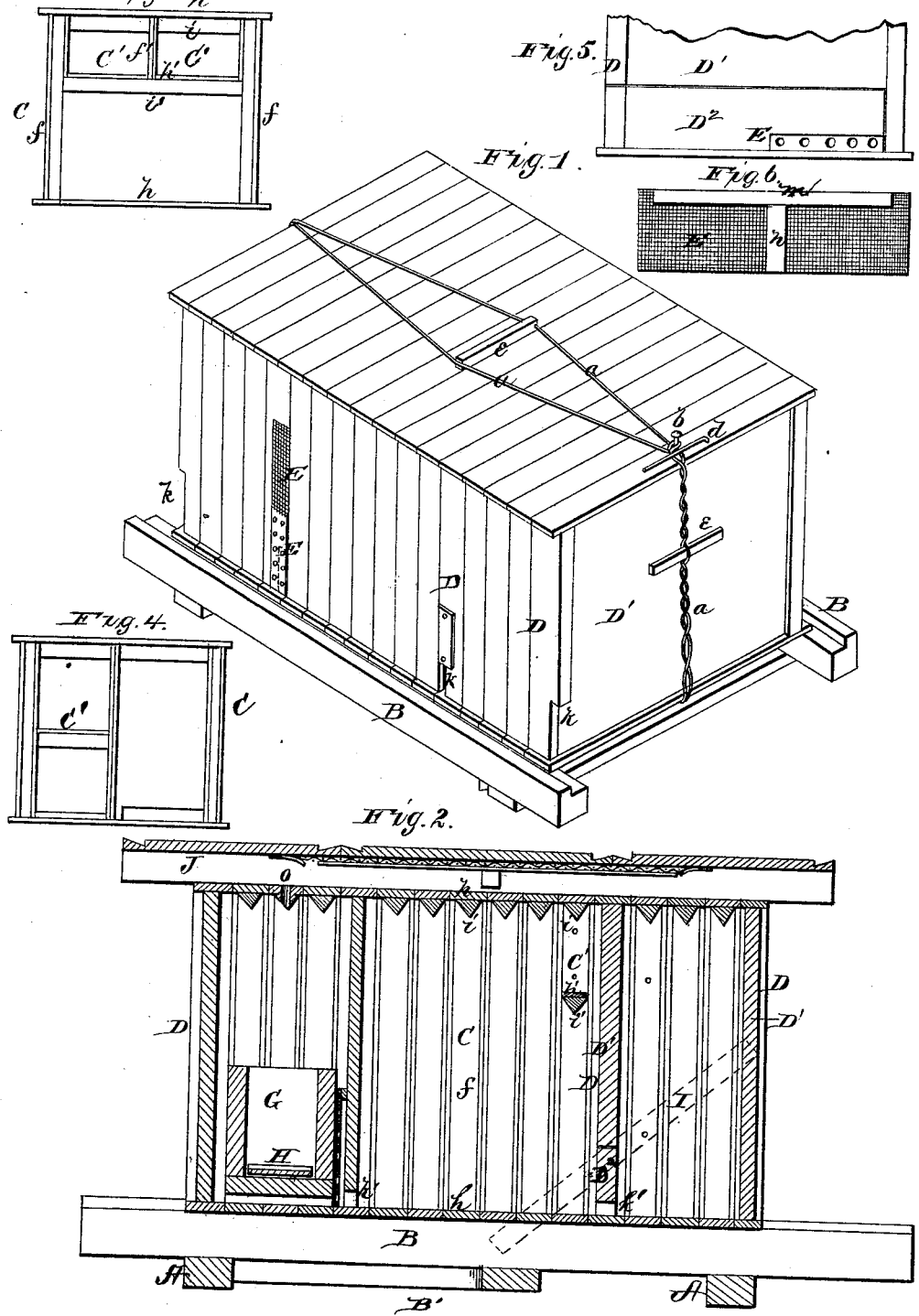

ALLEN T. WRIGHT, OF KOKOMO, INDIANA.

IMPROVEMENT IN BEE-HIVES.

Specification forming part of Letters Patent No. 195,870, dated October 2, 1877; application filed April 9, 1877.

*To all whom it may concern:*

Be it known that I, ALLEN T. WRIGHT, of Kokomo, in the county of Howard, and in the State of Indiana, have invented certain new and useful Improvements in Bee-Hives; and do hereby declare that the following is a full, clear, and exact description thereof, reference being had to the accompanying drawings, and to the letters of reference marked thereon, making a part of this specification.

The nature of my invention consists in the construction and arrangement of a bee-hive, as will be hereinafter more fully set forth.

In order to enable others skilled in the art to which my invention appertains to make and use the same, I will now proceed to describe its construction and operation, referring to the annexed drawings, in which—

Figure 1 is a perspective view of my bee-hive uncovered, showing one of many ways in which I arrange and combine the different parts of the hive for practical purposes. Fig. 2 is a longitudinal vertical section of the same with the roof or cover put thereon. Fig. 3 is a side view of a frame designed for brood and for obtaining honey in separate combs above the brood-comb, with a triangular comb-guide between for supporting them. Fig. 4 is a side view of a frame as designed for obtaining honey in the comb in small honey sash or frames. Fig. 5 is a side view of the lower portion of one of the end pieces. Fig. 6 represents a screen used in the bee-hive.

A A represent the cross-pieces, to which are connected the ribbed or rabbeted side pieces B B, forming a support for the hive. The bars B B may be fastened to any other suitable base or support, and are designed to keep the frames and end pieces in proper position. An additional bar, B', may be secured diagonally across between the bars B B, forming a brace to keep them in proper position.

The hive proper is formed of any suitable number of frames and end pieces, which may be augmented or diminished in number, and variously arranged and combined, as circumstances require, and they are fastened together by a cord, $a$, which is made fast in the middle to a nail, $b$, on the top of one of the end pieces, or to any other suitable projection thereon. Thence the cord $a$ is passed around the hive double, wrapped around the nail projection, and secured by a spring-catch, $d$, formed of bent wire or other suitable material, and tightened by twisting or bracing pins $e\ e$, the whole forming a fastening by which the frames and different parts of the hive may be readily and firmly united, and quickly loosened, as occasion requires.

The nail projection $b$ and wire catch $d$ may be secured to any suitable part of the hive, and the cord $a$ applied around the hive either vertically or horizontally, as may be desired.

The frames C are each formed of two vertical pieces, $f\ f$, which are preferably beveled, and a projecting piece, $h$, at top and bottom, with a triangular comb-guide, $i$, either removably or immovably secured to the under side of the top bar $h$, as occasion requires. When desired, removable sash C', having additional comb-guides $i'$, may be used in any one or more of the frames C, substantially as shown in Figs. 3 and 4.

The end pieces are each formed of a frame, D, of the same size—that is, in length and depth—as the frame C, and a board, D', secured centrally within the frame, which board may be about one-half of an inch less in thickness than the width of the frame inclosing it. A suitable notch or space, $k$, is made for a bee-entrance at one or both ends and on one side of the end pieces.

When it is desired to form the hive into two or more apartments and let the bees pass through the hive from one apartment to the others, I use similar frames, D, with boards $D^1$, to form division-boards between the several apartments, the apartments thus having their separate and distinct entrances $k$, and in such cases additional passages $k'$ are made at the lower edges of the boards $D^1$, to admit of communication between the several aparments; and when an extra large space is required for ventilating the bees, the board $D^1$ may be made in two parts, one part removable, as shown at $D^2$, and when this part is removed the space it occupied may be covered by a screen, E, for the purpose of confining the queen and drones, or all of the bees, to the hive, as occasion requires. This screen E is formed of wire-cloth or perforated sheet metal, or other suitable material, secured to a cleat, $m$, and fastened to a prop, *n*, as shown in Fig. 6. The perforations in this screen, when used to confine the queen and drones only in the hive, are about three-sixteenths of an inch in diameter each. This screen may also be used for the passages *k'* and entrances *k*, and for the latter unperforated slides may be used for contracting or entirely closing the same, as occasion may require.

G represents a feed-box, of simple construction, containing a float, H, to protect the bees when feeding. This box, when used, is placed within empty frames C for feeding the bees, and the aperture *o* is made above it through the top of a frame for admitting sirup or other food. In the absence of this box, frames containing empty combs may be filled with sirup and returned to the hive accessible to the bees.

I represents an inclined brace for supporting frames or end pieces when standing loosely upon the bars B B.

J represents simply a cap or covering for the hive when kept in the open air and not otherwise sheltered.

Having thus fully described my invention, what I claim as new, and desire to secure by Letters Patent, is—

1. The frame D, provided with the board $D^1$, and having the entrances *k* at its sides, substantially as and for the purposes herein set forth.

2. The screen E, with bar *m* and prop *n*, in combination with the frame D and board $D^1$, substantially as and for the purposes herein set forth.

In testimony that I claim the foregoing I have hereunto set my hand this 21st day of March, 1877.

A. T. WRIGHT.

Witnesses:
JOHN F. HAWKINS,
JAMES M. SCOTTON.